United States Patent Office 3,074,909
Patented Jan. 22, 1963

3,074,909
STABILIZATION OF POLYPROPYLENE
Albert S. Matlack, Wilmington, Del., assignor to Hercules Powder Company, Wilmington, Del., a corporation of Delaware
No Drawing. Filed Oct. 5, 1960, Ser. No. 60,566
4 Claims. (Cl. 260—45.75)

The present invention relates to polyolefin compositions and, more particularly, to the stabilization of stereoregular polymers of propylene and higher α-olefins against degradation by light.

Highly crystalline, high molecular weight stereoregular polymers of propylene and higher α-olefins are well known. One of the deficiencies of such polymers which must be overcome to enable their use in many applications is poor stability against the deleterious effect of light.

In accordance with the present invention it has been found that the stereoregular polymers of propylene and higher α-olefins can be stabilized very effectively against the deleterious effects of light by incorporating in such polymers a small amount of a nickel salt of an o-hydroxyphenylbenzotriazole having the formula:

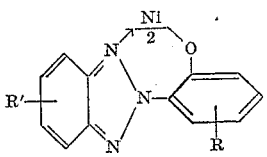

wherein R and R' are selected from the group consisting of hydrogen, hydrocarbon and oxahydrocarbon radicals.

Although any stereoregular polymer of a mono-α-olefin having at least 3 carbon atoms can be stabilized by means of the invention, the invention is particularly useful in stabilizing stereoregular polymers of monoolefins having from 3 to 6 carbon atoms including, for instance, polypropylene, poly(butene-1), poly(pentene-1), poly(3-methylbutene-1), and poly(4-methylpentene-1).

The nickel salts of o-hydroxyphenylbenzotriazoles used as additives in accordance with the invention increase the light stability of stereoregular polypropylene and related stereoregular polymers quite markedly. A still further increase in light stability can be achieved, however, by also incorporating a phenolic compound in the polymer. In fact, such outstanding light stability is obtained that it makes these stereoregular polymers usable for many applications requiring prolonged outdoor exposure.

The nickel salts that are used for the stabilization of stereoregular polymers in accordance with the invention can be made by methods known in the art. The o-hydroxyphenylbenzotriazoles can be made by diazotizing o-nitroaniline, coupling with a phenol, and reducing the resulting o-nitrazophenol with zinc and a base. The most preferred method of making the nickel salt comprises reacting nickel acetate with the o-hydroxyphenylbenzotriazole in an ethanol medium.

In the previously assigned formula, the permissible R substituents are numerous and varied. R and R', as stated, may each be hydrogen, in which case the nickel salt is that of o-hydroxyphenylbenzotriazole, or each may be a hydrocarbon or oxahydrocarbon radical. Typical hydrocarbon radicals that the R and R' substituents can comprise are alkyl, aryl, cycloalkyl, aralkyl and alkaryl radicals such as methyl, ethyl, propyl, n-butyl, decyl, octadecyl, phenyl, cyclohexyl, benzyl, tolyl and similar radicals. Typical oxahydrocarbon radicals are methoxy, ethoxy, propoxy, isopropoxy and the like.

The invention will be illustrated by the following examples in which parts and percentages are by weight unless otherwise specified.

EXAMPLE 1

In this example stereoregular polypropylene having a birefringent melting point of about 168° C. and a reduced specific viscosity of 3.8 (measured on a 0.1% solution of decahydronaphthalene at 135° C.) was thoroughly blended with 0.5%, based on the amount of polypropylene, of the nickel salt of 2(2-hydroxy-5-methylphenyl)benzotriazole. The blend was extruded into molding powder at 210° C. and the molding powder was then pressed into sheets 25 mils thick. Strips cut from these sheets, and 0.5 inch wide, were exposed to outdoor weathering in Miami, Florida, at a 45° angle facing south. In both the Fade-Ometer exposure and the outdoor exposure, the development of brittleness in each strip was observed by periodically examining the strip and noting the time elapsed until it became brittle, the embrittlement point being the time elapsed until a strip breaks when bent double. Exposure data are as follows:

Table I

Embrittlement time, outdoors
Control (no stabilizer) _____ 1 week
Stabilized polymer _____ 1½ months (ca. 20,000 Langleys)

EXAMPLE 2

The same procedure as in Example 1 was followed except in this case the polymer additionally contained 0.5% of the reaction product of 2 moles of p-nonylphenol and 1 mole of acetone, the reaction product comprising a mixture of 2,2-isopropylidene-bis(p-nonylphenol) and 2(2' - hydroxyphenyl) - 2,4,4 - trimethyl - 5',6 - dinonylchroman). The embrittlement time in outdoor exposure was increased to 2½ months (ca. 30,000 Langleys) by the addition of the phenolic additive.

The amount of the nickel salt incorporated in the polymer can be varied from a very small amount up to several percent. More specifically, beneficial results are normally obtained when it is employed in an amount from 0.01% to about 5% by weight of the polymer.

As previously mentioned, one of the preferred, but optional, modifications of the invention comprises incorporating into the polymer a phenolic compound in addition to the nickel salt. The phenolic compound, when used, preferably comprises from 0.01 to 5% by weight of the polymer. Suitable phenolic compounds that are useful in this embodiment include alkyl phenols, bisphenols, terpene phenols, aralkyl phenols and polyalkylchromans. Typical alkyl phenols that can be used include di-tert-butyl-p-cresol, o-nonylphenol, o,o-diisopropylphenol, etc. Bisphenols that are useful include 2,2'-methylene-bis-(5-isopropylphenol),
2,2'-methylene-bis-(4-methyl-6-isopropylphenol),
2,2'-methylene-bis-(4-methyl-6-tert-butylphenol),
2,2'-methylene-bis-(4-tert-butyl-6-methylphenol),
2,2'-methylene-bis-(4,6-di-tert-butylphenol),
2,2'-methylene-bis-(4-nonylphenol),
2,2'-methylene-bis-(4-decylphenol),
4,4'-methylene-bis-(2,6-di-tert-butylphenol),
4,4'-methylene-bis-(2-methyl-6-tert-butylphenol),
2,2'-ethylidene-bis-(4-methyl-6-tert-butylphenol),
2,2'-ethylidene-bis-(4,6-di-tert-butylphenol),
2,2'-ethylidene-bis-(4-octylphenol),
2,2'-ethylidene-bis-(4-nonylphenol),
2,2'-isopropylidene-bis-(4-methyl-6-isopropylphenol),
2,2'-isopropylidene-bis-(4-isopropylphenol),
2,2'-isopropylidene-bis-(4-isopropyl-6-methylphenol,
2,2'-isopropylidene-bis-(4-methyl-6-tert-butylphenol),
2,2'-isopropylidene-bis-(4-octylphenol),
2,2'-isopropylidene-bis-(4-nonylphenol),
2,2'-isopropylidene-bis-(4-decylphenol), 2,2'-isobutylidene-bis-(4-methyl-6-tert-butylphenol),
2,2'-isobutylidene-bis-(4-nonylphenol), etc.

Polyalkyl chromans that can be employed include 2(2'-hydroxyphenyl-2,4,4,5',6-pentamethylchroman,
4(2'-hydroxyphenyl)-2,2,4,5',6-pentamethylchroman,
2(2'-hydroxyphenyl)-5',6-diisopropyl-2,4,4-trimethylchroman,
2(2'-hydroxyphenyl)-5',6-diisopropyl-2,4,4,3',8-pentamethylchroman,
2(2'-hydroxyphenyl)-5',6-di-tert-butyl-2,4,4-trimethylchroman,
4(2'-hydroxyphenyl)-5',6-di-tert-butyl-2,2,4-trimethylchroman,
2(2'-hydroxyphenyl)-5',6-dioctyl-2,4,4-trimethylchroman,
2(2'-hydroxyphenyl)-5',6-dinonyl-2,4,4-trimethylchroman,
4(2'-hydroxyphenyl)-5',6-dinonyl-2,2,4-trimethylchroman,
2(2'-hydroxyphenyl)5',6-didecyl-2,4,4-trimethylchroman, etc.

Terpene phenols useful in this modification are reaction products of a terpene and a phenol as exemplified by 2,6-diisobornyl-p-cresol, 2,4-dimethyl-6-isobornylphenol, and similar products made by condensing phenol or an alkylphenol with a cyclic unsaturated terpene or dihydroterpene, e.g., camphene, carvomenthene, dipentene, α-pinene and the like.

The composition of the invention can also contain one or more additives in addition to those already mentioned. Such other additives include, for instance, pigments, dyes, antacids, fillers and the like.

What I claim and desire to protect by Letters Patent is:
1. A stereoregular polymer of an α-olefin having at least 3 carbon atoms containing as a light stabilizer therefor about 0.01% to about 5% by weight of the polymer of a nickel salt of an o-hydroxyphenylbenzotriazole having the formula:

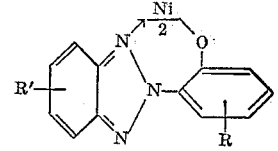

wherein R and R' are selected from the group consisting of hydrogen, hydrocarbon and oxahydrocarbon radicals.
2. The composition of claim 1 in which the nickel salt is the nickel salt of 2(2-hydroxy-5-methylphenyl) benzotriazole.
3. The composition of claim 1 containing also about 0.01% to about 5% by weight of the polymer of a phenolic compound.
4. The composition of claim 1 in which the polymer is polypropylene.

References Cited in the file of this patent
UNITED STATES PATENTS

| | | |
|---|---|---|
| 2,739,123 | Kennerly et al. | Mar. 20, 1956 |
| 2,837,528 | Pugin et al. | June 3, 1958 |

FOREIGN PATENTS

| | | |
|---|---|---|
| 716,338 | Great Britain | Oct. 6, 1954 |